US011865766B2

(12) United States Patent
Edfelder et al.

(10) Patent No.: US 11,865,766 B2
(45) Date of Patent: Jan. 9, 2024

(54) LONGITUDINAL STRETCHING UNIT AND METHOD FOR REPLACING AN ASSEMBLY EXPOSED TO WEAR IN A LONGITUDINAL STRETCHING UNIT

(71) Applicant: Brückner Maschinenbau GmbH, Siegsdorf (DE)

(72) Inventors: Anton Edfelder, Unterwössen (DE); Jakob Kreitmair, Siegsdorf (DE); Felix Winkler, Kolbermoor (DE); Anthimos Giapoulis, Traunstein (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 21 days.

(21) Appl. No.: 17/507,294

(22) Filed: Oct. 21, 2021

(65) Prior Publication Data

US 2022/0126503 A1    Apr. 28, 2022

(30) Foreign Application Priority Data

Oct. 22, 2020   (DE) ...................... 10 2020 127 803.9

(51) Int. Cl.
| | | |
|---|---|---|
| *B29C 55/06* | (2006.01) | |
| *B29C 55/18* | (2006.01) | |
| *B29C 33/70* | (2006.01) | |

(52) U.S. Cl.
CPC .............. *B29C 55/06* (2013.01); *B29C 33/70* (2013.01); *B29C 55/18* (2013.01)

(58) Field of Classification Search
CPC ....... B29C 48/256; B29C 33/70; B29C 33/72; B29C 33/74; B29C 33/306
See application file for complete search history.

(56) References Cited

U.S. PATENT DOCUMENTS

| | | | | |
|---|---|---|---|---|
| 4,632,655 A | * | 12/1986 | Benkwitz .............. | B21B 31/103 100/168 |
| 5,184,379 A | | 2/1993 | Bloo et al. | |

(Continued)

FOREIGN PATENT DOCUMENTS

| | | |
|---|---|---|
| DE | 14 04 397 | 10/1968 |
| GB | 1103756 | * 2/1968 |
| WO | 2015/128467 | 9/2015 |

OTHER PUBLICATIONS

Extended European Search Report for Application No. 21194569.6, two pages, dated Feb. 3, 2022.

(Continued)

*Primary Examiner* — Jeffrey M Wollschlager
(74) *Attorney, Agent, or Firm* — Nixon & Vanderhye P.C.

(57) ABSTRACT

An improved longitudinal stretching unit is disclosed, in addition to the installation position or operating position (A) for the assembly to be replaced, a standby position (D) and/or standby station at which a further assembly is kept on standby. The standby position (D) and/or the standby station is arranged and/or configured in relation to the longitudinal stretching unit such that the further assembly provided at this standby position (D) and/or standby station, already before the installation at the operating position (A), is brought or can be brought to operating temperature or at least to a preheating temperature that is higher or less than 30° C. lower than operating temperature.

10 Claims, 8 Drawing Sheets

(56) References Cited

U.S. PATENT DOCUMENTS

Figure 1A:
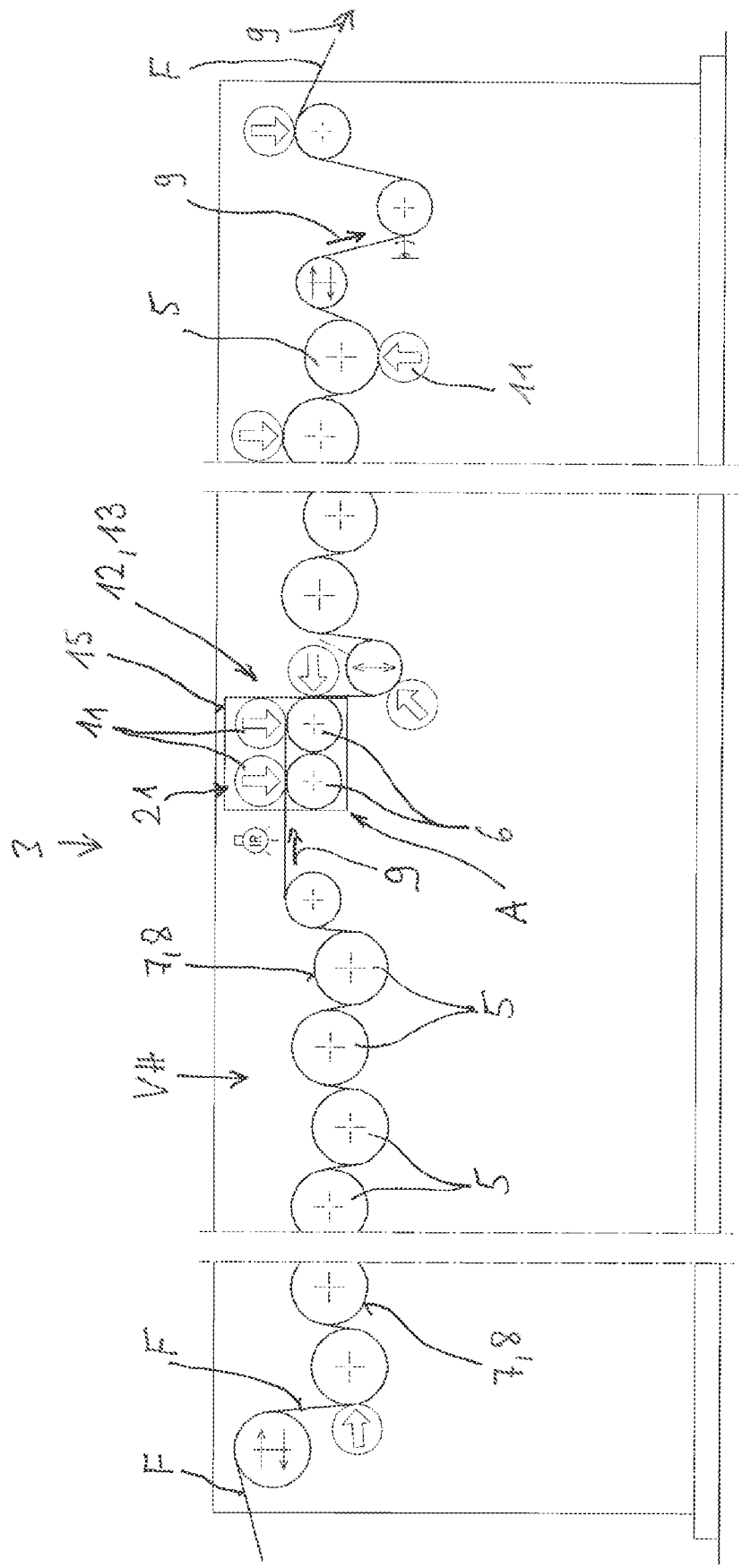

| | | | | |
|---|---|---|---|---|
| 7,752,961 | B2* | 7/2010 | Oedl | B65H 20/02 |
| | | | | 425/143 |
| 2008/0083999 | A1* | 4/2008 | Merrill | B29D 11/00 |
| | | | | 264/2.7 |
| 2009/0032166 | A1* | 2/2009 | Aoshima | B29C 66/83221 |
| | | | | 156/580 |
| 2012/0126445 | A1 | 5/2012 | Rasmussen et al. | |
| 2015/0067995 | A1* | 3/2015 | Rasmussen | B29C 55/065 |
| | | | | 26/99 |
| 2017/0021555 | A1 | 1/2017 | Rasmussen | |
| 2019/0140239 | A1* | 5/2019 | Mizuno | B29D 7/01 |

OTHER PUBLICATIONS

India Examination Report with English translation for Application No. 202124047622, two pages, dated May 20, 2022.

\* cited by examiner

LONGITUDINAL STRETCHING UNIT AND METHOD FOR REPLACING AN ASSEMBLY EXPOSED TO WEAR IN A LONGITUDINAL STRETCHING UNIT

CROSS RELATED APPLICATION

This application claims priority to German Patent Application DE 10 2020 127 803.9, filed Oct. 22, 2020, the entire contents of which is hereby incorporated by reference.

The invention relates to a longitudinal stretching unit according to the preamble of claim 1 and a method for replacing an assembly exposed to wear in a longitudinal stretching unit.

In the case of a plastics film longitudinal stretching unit, a film is stretched longitudinally between successive rollers, wherein in each case a downstream roller rotates at a higher rotational speed or orbital speed than a preceding roller. This results in a longitudinal stretching of the film in the gap between these two successive rollers.

In order to ensure that the film rests neatly on the relevant process roller or deflection roller, the aforementioned pressing rollers or nip rollers are used to press the moving material web, in particular a plastics film to be stretched, completely onto the shell of a deflection roller or process roller.

This film is then passed through the longitudinal stretching unit or the longitudinal stretching system in further work steps. The longitudinal stretching unit can also be part of a sequential stretching system in which the film is stretched at first in the longitudinal direction and then in a subsequent stage in the width direction or, vice versa, first in the width direction and then in the longitudinal direction.

When stretching in the longitudinal direction, the film to be stretched is passed over heated rollers and thereby heated in order to bring it to the appropriate stretching temperature. The aforementioned higher roller speed of each downstream roller then brings about the longitudinal stretching, i.e., in the so-called longitudinal stretching direction, which is also abbreviated to the MD direction.

However, the components provided in such a longitudinal stretching unit, for example in the form of a longitudinal stretching system, in particular the process rollers and/or pressing rollers provided there, are subject to a non-negligible amount of wear. Above all, the surfaces of such rollers are subject to wear, which can adversely affect the grade and quality of the plastics film to be stretched. Therefore, such components and in particular rollers, i.e., process rollers and/or pressing rollers, have to be replaced when they are worn out.

The more complicated or complex the installation situation or the specific fastening mechanism (for example the type of mounting of the rollers), the more complex and complicated the removal of the components to be replaced and the installation of the new components to be used, in particular the aforementioned rollers, becomes.

The removal of the aforementioned components/rollers is particularly complicated when the components to be changed, i.e., again the aforementioned rollers, are connected to adjacent assemblies and components, for example by the provided heating of the rollers and the provided piping and the rotary leadthroughs on the sealing head etc.). The complexity of the overall system is also increased by the fact that the corresponding rollers are connected to motors and/or gears and/or clutches and/or cardan shafts, all of which are released for removing the old component and after inserting the new components and in particular the new rollers to be used, in turn, have to be mounted, connected and fastened.

It becomes even more complicated when adjacent assemblies have to be placed in a certain orientation with respect to the units to be replaced. This applies, for example, when at a relevant point at which, for example, a component/roller or a roller arrangement is to be replaced, namely exactly between a preceding roller and a downstream roller as a roller arrangement in the pull-off direction of the plastics film.

The disadvantages in the prior art in this regard can be briefly summarised as follows:
- the removal of the components/rollers to be changed is very complex and time-consuming;
- the disconnection of the components to be replaced from the existing connections for the pneumatics, for the heating devices, in particular in the form of heating water lines (through which water at up to 130° C. is passed) and for the electrical connection lines, is also complex and time-consuming;
- however, the reconnection of the components in question during installation is also complex, in particular the connection, in turn, of the heating water pipes that have to be refilled and bled (to free them from the trapped air during installation), as well as the connection of the pneumatic and electrical lines;
- furthermore, setup processes must be carried out in the longitudinal stretching unit or the longitudinal stretching system in order to precisely adjust the new components or rollers to be installed relative to the rollers arranged upstream in the pull-off direction as well as relative to the components or rollers installed downstream (this applies, for example, in particular with regard to the parallelism of interacting rollers such as a process roller and a pressing roller);
- finally, function tests must be carried out before the system is restarted in order to check whether all lines have been correctly connected and joined.

Against this background, it is the object of the present invention to create an improved longitudinal stretching system or an improved longitudinal stretching unit on the one hand and an improved method on the other hand, which allows components and in particular rollers of such systems to be changed, i.e., exchanged, in a faster and less complicated manner.

The object is achieved with respect to the device according to the features specified in claim 1 and with respect to the method according to the features specified in claim 13. Advantageous embodiments of the invention are specified in the dependent claims.

The solution according to the invention allows a simple and, above all, uncomplicated changing of components to be exchanged, and in particular rollers. This also applies in particular to untrained personnel. This is because the structure according to the invention is designed in such a way that it can also be carried out without lengthy instruction, namely due to its preferably almost self-explanatory structure and, thus, the almost self-explanatory implicit functionality.

In the scope of the invention, there is a significant time saving when changing the components in question, namely due to the good accessibility, the defined work steps and the preferably clear interfaces.

Ultimately, however, this also allows shorter system downtimes, combined with lower production losses. The more frequently the corresponding units or components have to be changed due to wear, the more weight all of these properties carry.

The solution according to the invention is in particular characterised by an exchange unit to be replaced being positioned directly on the longitudinal stretching unit or the longitudinal stretching system. For this purpose, a frame or frame portion is preferably provided which is provided on the longitudinal stretching system on which, in turn, the exchange unit is kept on standby.

This positioning of the exchange unit takes place preferably above the preheating zone, i.e., the preheating rollers. This offers the possibility that the waste heat generated there can be used, so that the exchange unit is heated or preheated to the desired temperature within one to two days, for example.

In a preferred embodiment of the invention, the heating system of the rollers in the longitudinal stretching system is used to heat the exchange unit to the desired operating temperature during the preparation phase by means of simple heating piping.

In an alternative solution of the invention, it is even possible to position the exchange unit next to a longitudinal stretching system or a longitudinal stretching unit. In this case, however, the waste heat produced by the system is not sufficient to bring the exchange unit to the desired operating temperature or to maintain it at a desired operating temperature. In this case, it is therefore provided that the exchange unit provided laterally or adjacent to the longitudinal stretching system is connected to the heating system which is provided for heating the heating rollers in the longitudinal stretching system. In other words, a simply designed heating piping is sufficient to supply the exchange unit positioned laterally or adjacent to the longitudinal stretching system, for example, with hot water and to heat it to the desired operating temperature.

When replacing components or assemblies, they can, within the scope of the invention, be easily and quickly removed from the longitudinal stretching system and replaced by the exchange unit that is kept on standby and has already been preheated to operating temperature.

The components or assemblies to be replaced are designed as a module or plug-in module (cartridge).

These modules or plug-in modules preferably also have a positioning device which allows the exchange unit with the associated frame or module frame to be placed precisely and with an accurate fit in the longitudinal stretching system. This positioning device preferably has a compensation option for any thermal expansion between the frame of the module (module frame) and the frame or support frame of the longitudinal stretching system.

This positioning system can, for example, have a conical design on one end face and a design oriented transversely to, and in particular perpendicular to, the longitudinal direction of the system, for example in the form of a trapezoid, on the opposite end face. This positioning system, which is referred to, by way of example, as a "cone" or "trapezoid", ultimately ensures exact positioning in the longitudinal direction of the stretching system (MDO direction) and allows temperature equalisation between the two frames, i.e., between the frame of the exchange unit (i.e. the module) and the frame of the stretching system on the machine side, comparable to a fixed bearing on one end face and a floating bearing on the other end face of the component to be replaced or the rollers to be replaced.

In order to further improve the entire process of replacement, an intermediate position or an intermediate storage space is preferably provided on the longitudinal stretching system, at which position the assemblies which are at first removed and are to be replaced can be temporarily stored. This intermediate position is preferably arranged on the longitudinal stretching system in such a way that the space for the assembly installed in the operating position comes to lie between the ready space and the intermediate position.

Overall, a further development of the invention is also provided that the interfaces for connecting the heating lines, the pneumatic lines and/or the electrical lines are designed as clearly defined or coded connections, plugs and/or quick-release couplings that allow quick removal and assembly.

In other words, the modules in question are equipped with the exchange units having quick-change systems which allow the modules to be installed and removed easily, safely and quickly.

In summary, it can be stated that within the scope of the invention it is possible, for example, to exchange a plurality of stretching rollers combined as a module within a few hours (for example within 1-2 hours). Normally, such a change would require at least twice that amount of time, with the solution according to the prior art making it even more difficult that after replacing and installing an exchange unit in its operating position, the associated rollers must then also be heated to operating temperature, which means that, again, a period of at least one to two hours may pass.

Figure 1B:
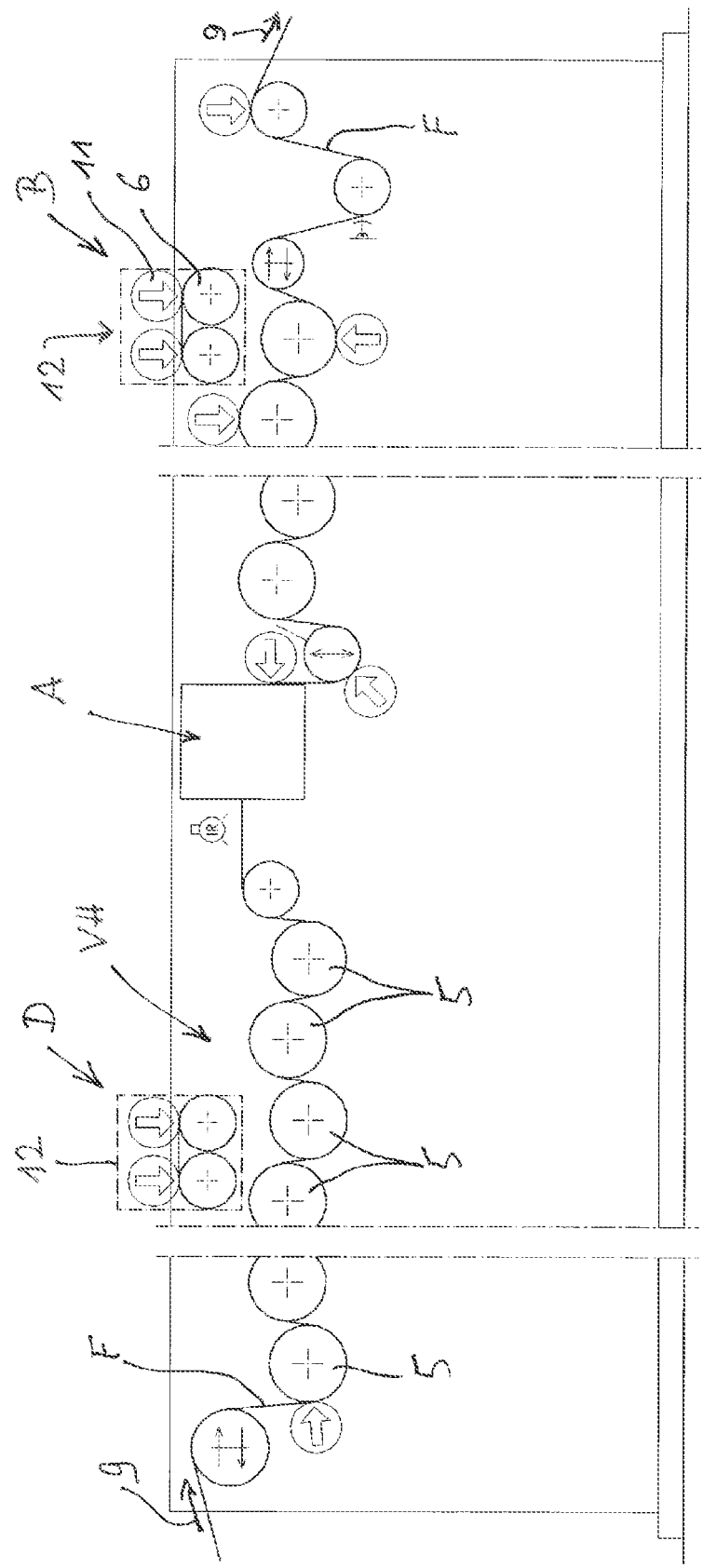
Figure 1C:
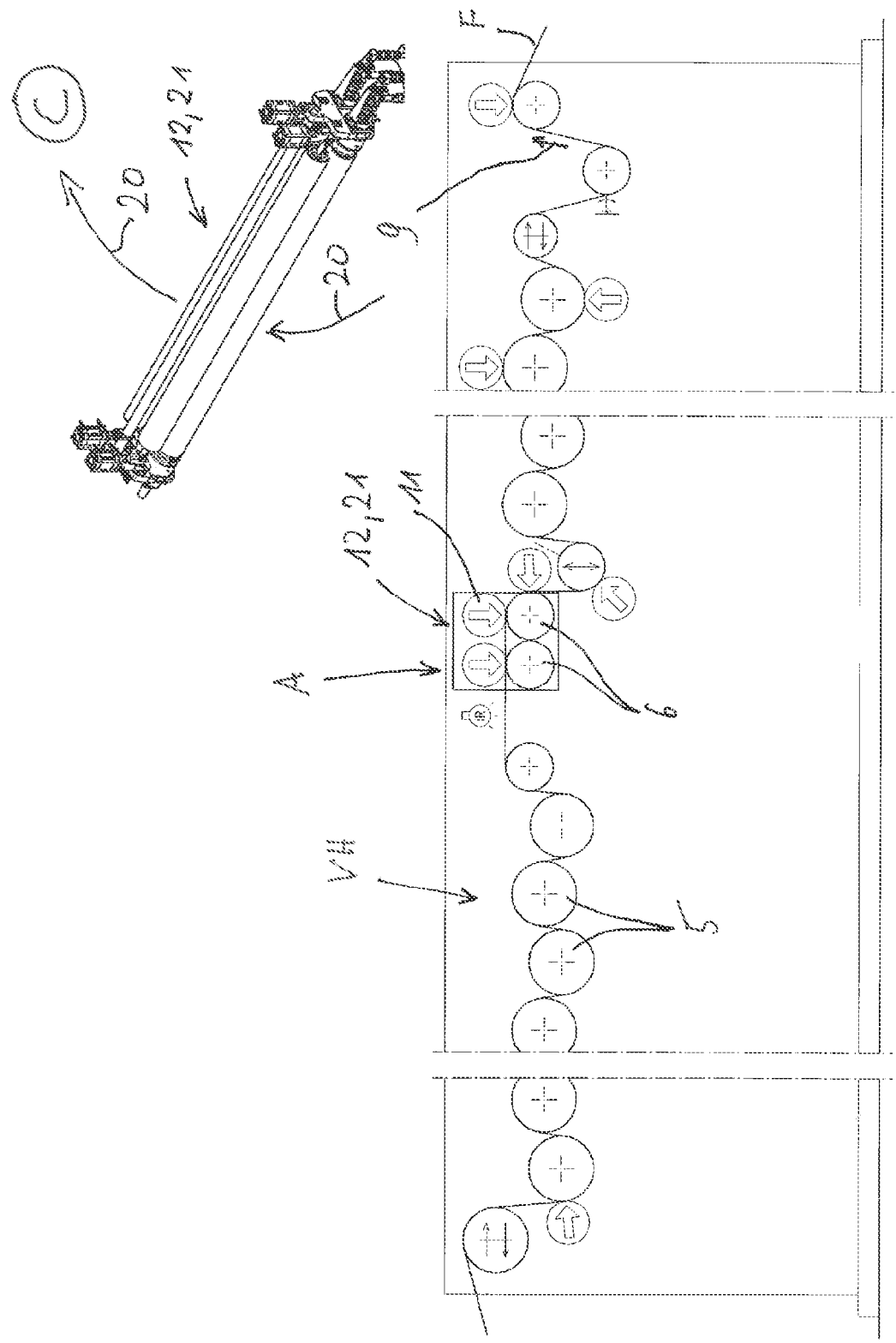
Figure 2:
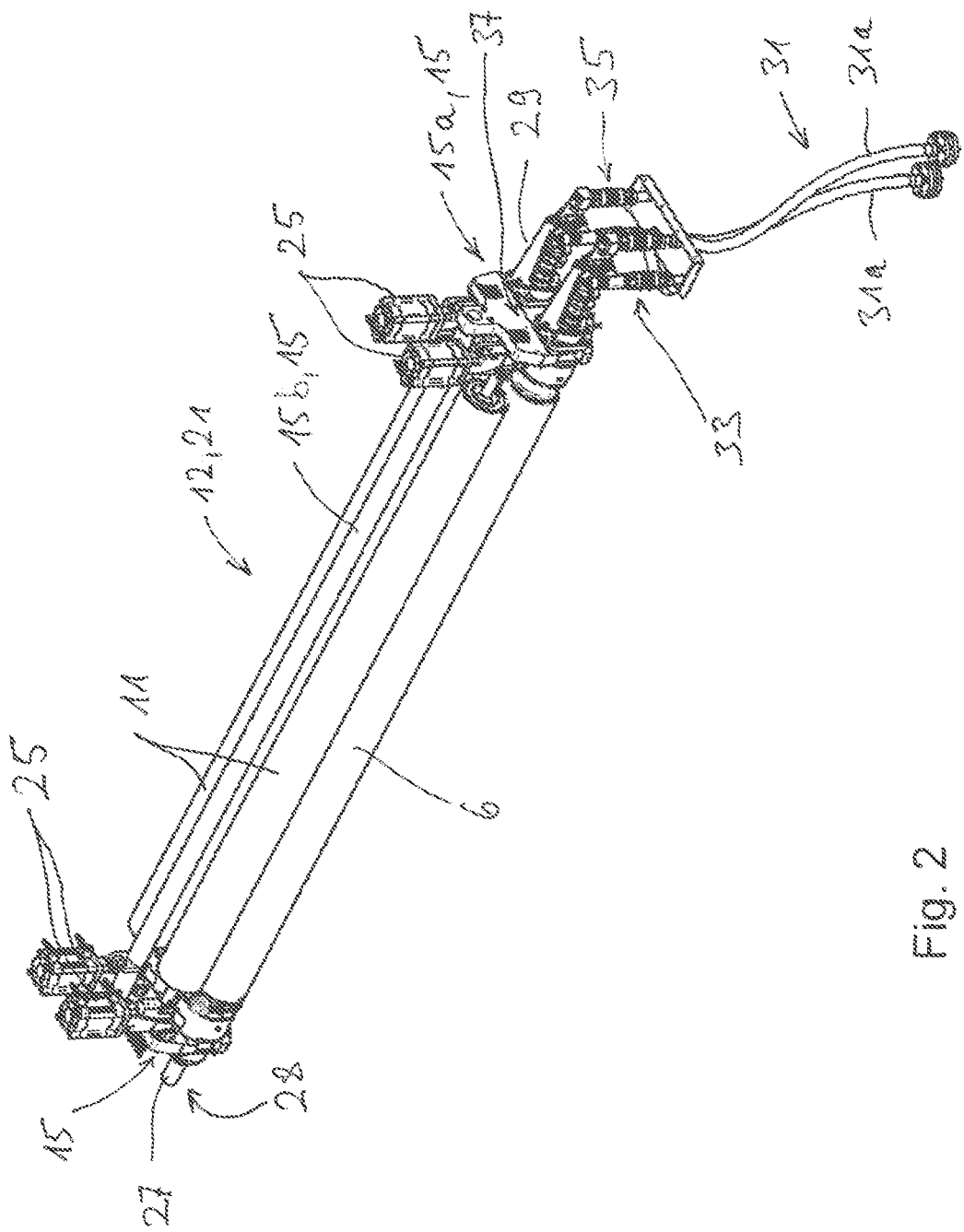
Figure 3:
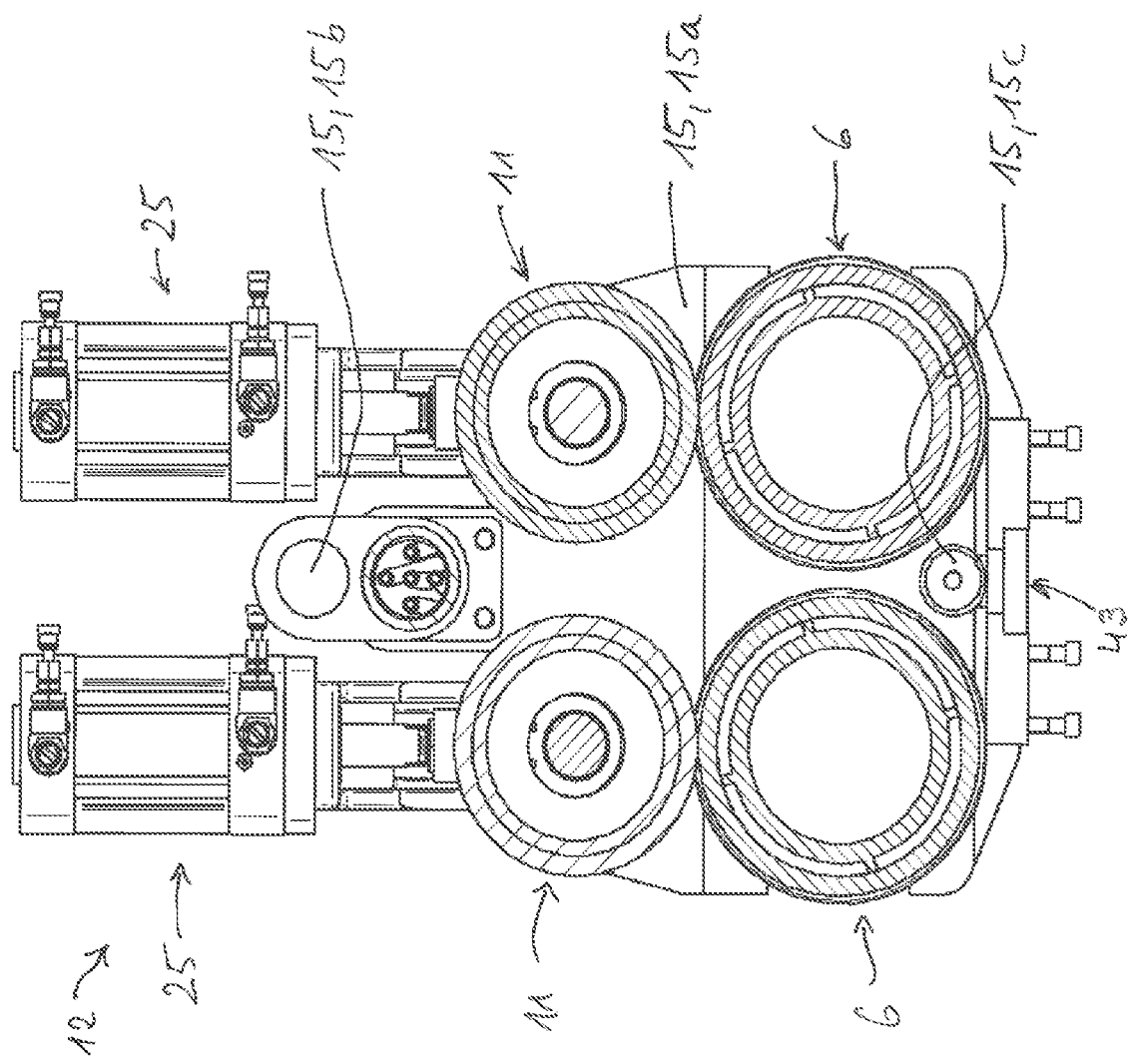
Figure 4:
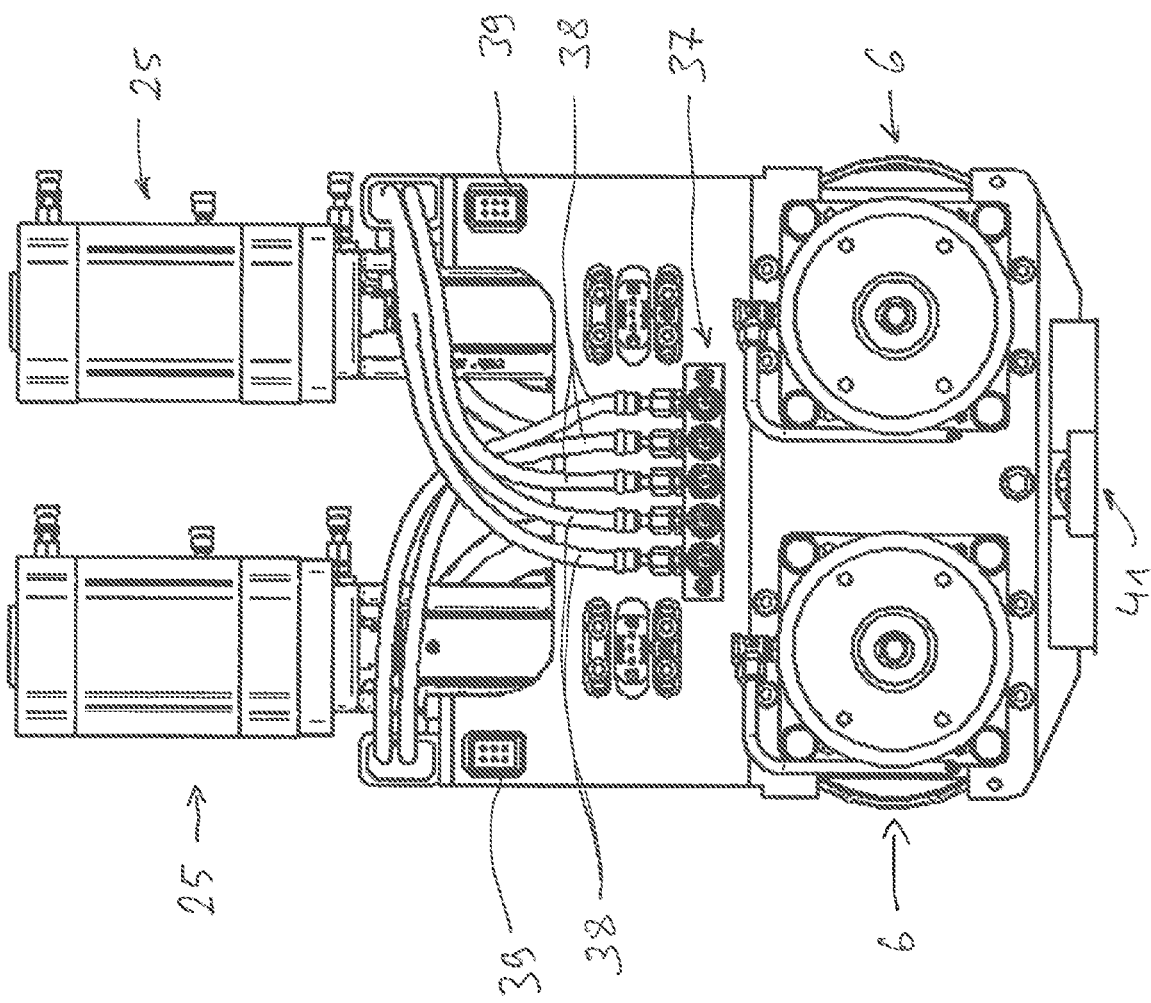
Figure 6:
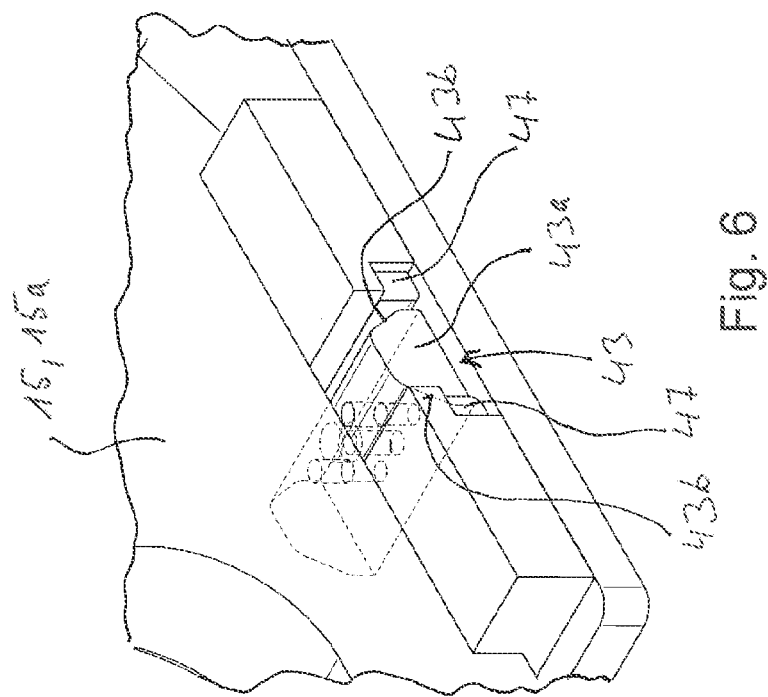
Figure 5:
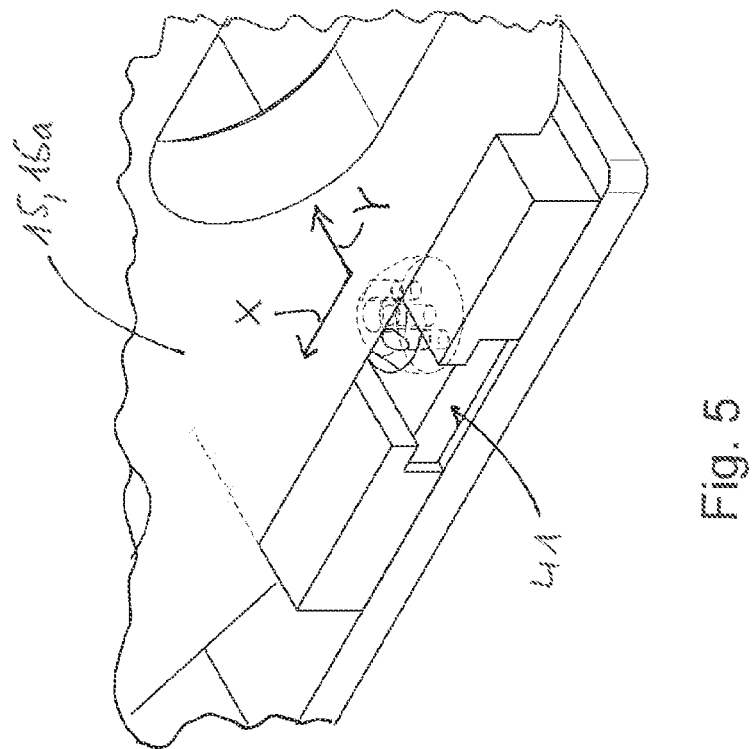
Figure 7:
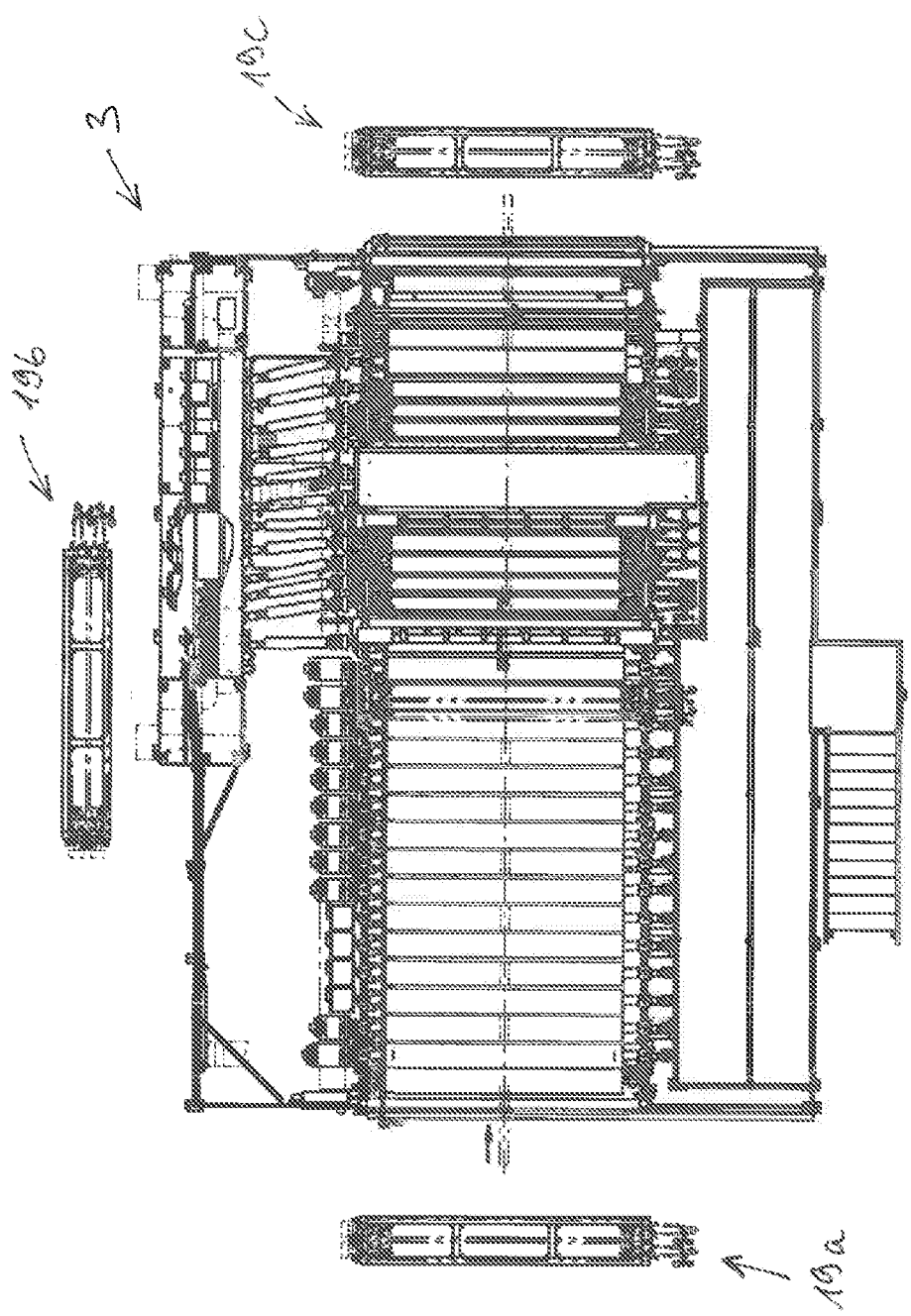

The invention will be explained in more detail hereinafter with reference to drawings, which show, in detail:

FIGS. 1a to 1c:

three schematic side views of a longitudinal stretching unit or a longitudinal stretching system for stretching a plastics film, in which intermediate portions are omitted and not shown to allow for better illustration;

FIG. 2: an assembly having two heating rollers and two pressing rollers, which are installed in an associated frame to form a module or plug-in module (cartridge);

FIG. 3: a cross-sectional view perpendicular through the longitudinal axes of the rollers shown in FIG. 2;

FIG. 4: an end face view of the embodiment according to FIG. 3 omitting the quick-release couplings additionally provided there for the heating;

FIG. 5: an enlarged detailed view of one end face of the module with a conical positioning system (preferably on the driving side of the stretching system);

FIG. 6: a corresponding enlarged detailed view of the opposite end face of the module with a positioning system, preferably in a trapezoidal shape, which allows an axial compensation movement in the axial longitudinal direction of the rollers; and FIG. 7: a further embodiment according to the invention in a top view.

FIG. 1a is a schematic side view of a longitudinal stretching system 3 with a plurality of rollers 5, which are also referred to hereinafter as deflection rollers and/or process rollers. A longitudinal stretching system 3 can also be referred to instead as a longitudinal stretching unit 3 or a longitudinal stretching machine 3.

In the illustration according to FIG. 1a, an extruder for processing the plastics film material is usually provided on the left, i.e., on the input side, which extruder usually releases a melt via a slot die onto a cooling roller rotating in a water bath. There could also be no water bath at all. A bath with any desired cooling liquid (e.g., solvent, or any mixture) is also possible. There are therefore no restrictions to a specific cooling method.

The film F, which is usually solidified and/or crystallised as a result, is then fed to the longitudinal stretching system 3 on the left in FIG. 1 and then runs over a number of rollers 5 of a preheating stage VH in a meandering manner, before leaving the longitudinal stretching unit on the right in FIG. 1. The film F is then fed to a transverse stretching unit (TDO) if it is to be additionally stretched in the transverse direction. In this respect, as with the production of the melt film, reference is made to the previously known devices and systems.

In the longitudinal stretching unit, the film F runs at a partial angle of wrap around the aforementioned rollers 5, said film then resting on the corresponding roller surface 7 or the roller shell 8 at this angle of wrap in order to be moved at the corresponding shell orbital speed.

The individual rollers 5 are heated to the optimum temperature in each case in order to bring the film itself to the optimum stretching temperature and to maintain this temperature.

It must be ensured in the method that the film is placed on or applied to the rollers, i.e., the roller surface 7 or the roller shell 8 of the rollers 5, uniformly and without trapping any air.

For this purpose, a plurality of pressing rollers 11, which are also sometimes referred to as nip rollers or nip rolls, can be provided in the longitudinal stretching unit 3.

Longitudinal stretching can be effected between two consecutive rollers by a downstream roller in the pull-off direction 9 being driven at a higher circumferential speed than a preceding roller such that longitudinal stretching of the material web moving through the system is effected in the free portion between two successive rollers.

In the illustration according to FIG. 1a, such a stretching stage 13 having two stretching rollers 6 and two pressing rollers 11 is shown at position A. This unit forms a module or plug-in module 12 which comprises, in addition to the rollers 6 and 11, also a frame or a module frame 15, among other things.

As can be seen from the side view according to FIG. 1b, a standby station 19 is located upstream in the pull-off direction 9 of the plastics film F at a position D. A corresponding module 12 is provided at this standby station 19, i.e., it is quasi parked.

The module 12 is a component or an assembly 21 which, for example, is subject to greater wear. In the embodiment shown, after a certain period of operation, the surfaces of the rollers 6 and 11 in the module 12 showed traces of higher stress due to the stretching stage formed there.

If the aforementioned module 12 is to be removed from the longitudinal stretching unit due to the wear and tear that has taken place and replaced by another module, all that is required is to loosen the corresponding quick-release fasteners and quick-release couplings explained below and remove the relevant module from its installation position at position A (FIGS. 1a and 1b).

The removed module 12 is then placed, for example, in an intermediate position B above the system, which, for example, is located downstream of the installation position A of the module to be replaced in the pull-off direction. This is shown in FIG. 1b. The removed module leaves an empty space at position A. After a module 12 showing signs of wear and therefore requiring replacement has been removed and, for example, brought to the intermediate parking position B, the module 12 which is switched to standby mode and is upstream in the pull-off direction and above the longitudinal stretching system in position D, can then be moved to its installation position A and connected there by the corresponding quick-release couplings and quick connectors that are there being connected.

The peculiarity in the aforementioned case is that the module provided with fresh and unused roller surfaces is not kept on standby just anywhere, but above (or within) the preheating zone. It is particularly preferred to keep the module ready for replacement above the preheating rollers. This opens up the possibility that the new module which is in the standby position 19 and is provided, for example, with fresh and unused roller surfaces, is already preheated by the waste heat generated in the preheating zone in such a way that after the module 12 has been installed in the installation position A, no further heating phase is necessary for the components in the module 12.

Preferably, however, the module 12 in its standby position 19 is also connected to the heating system provided for the stretching system, likewise preferably provided with a quick-release coupling. In other words, the device provided for the rollers 5 in the preheating zone VH is also used to hold the module 12 located in the ready position. This can be done simply by means of heating piping, which starts from the heating pipes provided for heating the rollers 5 in the preheating zone VH and leads to the rollers 6 to be heated.

As a rule, after replacing a module 12 located at position A by replacing the module 12 which is at first located at the ready position D, 19, the previously removed module 12 is temporarily stored or temporarily parked in an intermediate position B or intermediate station B. In particular, when the ready position D, 19 lies in front of the installation position A in the pull-off direction 9 of the film F, the position between position or intermediate station D is located in the pull-off direction 9 of the film F after the installation position A. The module 12 can then later be removed and reprocessed and prepared at another point C for reuse. This is indicated abstractly in FIG. 1c by means of the arrows 20.

The further structure of a module 12, shown by way of example and to be replaced as a wear part, is shown on the basis of FIGS. 2 to 4.

In the embodiment shown, the module 12 comprises the two aforementioned heating rollers 6, each of which works together with pressing rollers 11. The two pairs of rollers 6 and 11, which are in contact with one another, are installed and held in a module frame 15. The module frame 15 comprises the two module frame end pieces 15a provided on the end face side which are fixedly connected to each other below the stretching rollers 6 forming the module frame 15 via an upper connection 15b which is, for example, rod-shaped or bridge-shaped and is located above the pressing rollers 11, and a lower connection 15c, which is also, for example, rod-shaped or bridge-shaped. The rollers 6 comprise a functional surface to be replaced when worn. The pressing rollers 11 are provided, for example, with a combined roller surface, which can also be subject to wear. Furthermore, pneumatic cylinders 25 are also provided for adjusting the rollers.

It can be seen in particular from FIG. 2 that a clamping set 28 for a cardan shaft connection 27 for driving the heating rollers 6 is provided on the end face of the module 12 that faces away. On the opposite end face, which is therefore at the front in FIG. 3, leadthroughs 29 (in particular rotary leadthroughs 29) for the two rollers 6 are provided which comprise piping 31 that is required for roller heating in the form of two heating lines 31a.

On the same side, quick-release couplings 35 are provided which, in the embodiment shown, connect the aforementioned rotary leadthroughs 29 and their adjoining, downward-pointing connecting pieces 33 to the piping 31. These connections are provided for heating.

The side view according to FIG. 4 also shows the interface 37 for the pneumatic components, which can also be connected or removed with quick-release couplings. In this case, five pneumatic connections 37 are present in the embodiment shown, of which five pneumatic lines 38 (FIG. 4) continue to the pressure cylinders contained in module 12. The number of five pneumatic lines is only mentioned by way of example; there can also be more or fewer pneumatic lines.

In addition, the interfaces 39 for the electrical connections are also indicated. To the left and right of the interfaces 37 for the pneumatic components, the setting mechanisms for the pressing rollers are also shown.

All connections, i.e., in particular the electrical connections, the pneumatic connections and the heating connections, are preferably designed in the form of quick-release fasteners or so-called quick-release couplings in order to be able to quickly connect and disconnect corresponding lines. Such connections are sufficiently well known in the prior art and many of them are known in different embodiments.

If, after removing a module 12 to be replaced, a module 12 held in standby position 19 is to be used in operating position A, the entire module 12 with the frame or module frame 15, by which the rollers 6 and 11 and the pneumatic cylinders 25 are held, can be brought to operating position A and installed there.

In order to allow a precisely fitting installation in a simple manner, a conical positioning system 41 is provided on one end face and a transverse positioning system 43 allowing a relative change in length in the axial direction in the roller, i.e., transversely or vertically, is provided at the corresponding point on the opposite end face to pull-off direction 9 of the film F. This results in an automatic self-adjustment of the module 12 with respect to the machine frame 15 of the stretching system when the module frame is placed at the installation position A. The conical positioning system is preferably provided on the driving side of the stretching system, and the transverse positioning system is preferably provided on the opposite operating side.

By means of the conical positioning system 41 (see also FIG. 5), the module frame 15 or the module frame end pieces 15a can perform an angular compensation movement about the central axis penetrating the conical shape (perpendicular to the plane of the plastics film). The primary aim of this variant, however, is to be able to place the module frame 15 more easily and to be able to fix it on the fixed side in the X and Y directions.

The positioning system 43 on the opposite end face, which preferably allows a transverse change in length, allows length compensation, preferably perpendicular to the pull-off direction 9 of the film F, between the frame 15 of the module frame and the machine frame, i.e., the frame of the stretching system.

In the embodiment shown, the transverse positioning system allowing a length compensation movement is designed trapezoidally so that the trapezoidal element 43a with two mutually converging flanks 43b interacts with two side webs 47 or projections 47 spaced apart in the pull-off direction of the film. When the module frame 15 is set in place, the side webs 47 run up against one or the other trapezoidal side flank 43b of the positioning element 43a, so that, in the end position of the trapezoidal positioning element 43a, it sits between the two side webs or boundaries 47 with as little play as possible or with almost no play. The trapezoidal design also serves to make it easier to place and align the module frame 15. Preferably, the trapezoidal positioning element 43a as well as the positioning cone 41a are fixedly attached to the machine frame, i.e., to the frame of the stretching system. The counterparts formed for this purpose on the module frame 15, for example in the form of a hollow cylinder or in the form of the side webs 47, are formed on the underside of the module frame 15. The corresponding positioning elements and the counterparts interacting therewith can also be formed conversely on the module frame 15 or on the machine frame.

In an alternative solution of the invention, it is even possible to position the exchange unit next to a longitudinal stretching system or a longitudinal stretching unit. This is indicated in FIG. 7, FIG. 7 shows a partial plan view of a longitudinal stretching system in which the film is moved through it from left to right. A standby station 19 for preheating a module 12 that is ready for replacement can be provided, as shown with reference signs 19a, 19b or 19c, for example in front of, next to or behind the system in the pull-off direction of the film. A position on the operator side opposite 19b would also be possible.

In the case of such a positioning of the standby station 19 and a module 12 kept on standby here, however, the waste heat produced by the system is not sufficient to bring the exchange unit to the desired operating temperature or to maintain it at a desired operating temperature. In this case, it is therefore provided that this exchange unit 12 provided laterally or adjacent to the longitudinal stretching system is preferably connected to the heating system which is provided for heating the heating rollers in the longitudinal stretching system, i.e., in particular connected to the heating rollers 5 provided in the preheating zone VH. In other words, a simply designed heating piping is sufficient to supply the exchange unit positioned, for example, laterally or generally adjacent to the longitudinal stretching system, for example, with hot water and to heat it to the desired operating temperature. The heating in addition to the longitudinal stretching machine can of course also be done by a separate heating unit.

The invention claimed is:

1. A longitudinal stretching system, comprising a longitudinal stretching unit, wherein:
    the longitudinal stretching unit comprises a plurality of rollers arranged next to one another in a pull-off direction of a plastic film (F),
    a plurality of the rollers is part of a preheating station (VH),
    the longitudinal stretching unit further comprises at least one assembly exposed to wear, which is arranged in an installation position or operating position (A),
    the assembly is arranged replaceably in the longitudinal stretching unit and can be removed and replaced by a further assembly,
    wherein the longitudinal stretching system comprises, in addition to the installation position or operating position (A) of the longitudinal stretching unit, a standby position (D) and/or standby station at which the further assembly is kept on standby, wherein
    the standby position (D) and/or the standby station is provided at either one of the following locations;
        in the preheating station (VH) on the longitudinal stretching unit in a region directly above at least some of the plurality of the rollers of the preheating station (VH), or
        laterally to the longitudinal stretching unit, wherein the further assembly provided in the standby positon (D) and/or the standby station laterally to the longitudinal stretching unit is joined via heating piping to a heating pipe system for heating the rollers in the preheating station (VH) and connected thereto, and the standby position (D) and/or the standby station is arranged and/or configured in the longitudinal stretching system such that the further assembly provided at this standby position (D) and/or standby station, already before the installation at the operating position (A), is brought or can be brought to operating temperature or at least to a preheating temperature that is higher or less than 30° C. lower than operating temperature.

2. The longitudinal stretching system according to claim 1, wherein the standby position (D) and/or the standby station is provided directly above at least some of the plurality of the rollers provided in the preheating station (VH).

3. The longitudinal stretching system according to claim 1, wherein the further assembly provided on the longitudinal stretching unit in the standby position (D) and/or the standby station is joined via heating piping to the heating pipe system for heating the rollers in the preheating station (VH) and connected thereto.

4. The longitudinal stretching system according to claim 1, wherein, alongside or in addition to the operating position (A) and the standby position (D), an intermediate parking position (B) is provided in which an even further assembly, which is at first located in the operating position (A) and then removed, can be temporarily positioned.

5. The longitudinal stretching system according to claim 4, wherein the intermediate parking position (B) is provided
   a) with reference to the pull-off direction of the plastic film (F) in a position downstream of the operating position (A) if the standby position (D) is arranged upstream of the operating position (A) with reference to the pull-off direction of the plastic film (F), or
   b) with reference to the pull-off direction of the plastic film (F) in a position upstream of the operating position (A) if the standby position (D) is arranged downstream of the operating position (A) with reference to the pull-off direction of the plastic film (F).

6. The longitudinal stretching system according to claim 1, wherein the assembly further comprises a module frame which is positionable by means of a positioning system at least in the operating position (A) and/or at the standby position (D) and/or an intermediate parking position (B).

7. The longitudinal stretching system according to claim 6,
   wherein a positioning system provided on a first end face of the module frame is designed in such a way that the module frame is pivotable at least at a partial angle about an axis oriented perpendicular to a pull-off plane of the plastics film (F), and in that
   a positioning system provided on a second end face of the module frame being opposite to the first end face of the module frame is designed such that an axial compensation movement in the longitudinal direction of the assembly can be carried out between the module frame and a frame of the longitudinal stretching unit.

8. The longitudinal stretching system according to claim 7, wherein the one positioning system provided on the first end face of the module frame is conical or truncated cone-shaped, and in that the positioning system provided on the second opposite end face of the module frame is trapezoidal in design and interacts with two side borders or side webs.

9. The longitudinal stretching system according to claim 1, further comprising an interface for connecting a piping system through which a liquid or gaseous heating medium can flow and/or an interface for connecting pneumatic lines and/or an interface for connecting electrical lines is formed on the assembly to be replaced.

10. A method for replacing an assembly exposed to wear in the longitudinal stretching system comprising a longitudinal stretching unit, where: the longitudinal stretching unit comprises a plurality of rollers arranged next to one another in a pull-off direction of a plastic film (F), a plurality of the rollers is part of a preheating station (VH), the longitudinal stretching unit further comprises at least one assembly exposed to wear, which is arranged in an installation position or operating position (A), the assembly is arranged replaceably in the longitudinal stretching unit and can be removed and replaced by a further assembly, wherein the longitudinal stretching system comprises, in addition to the installation position or operating position (A) of the longitudinal stretching unit, a standby positon (D) and/or standby station at which the further assembly is kept on standby, wherein the standby position (D) and/or the standby station is provided at either one of the following locations: in the preheating station (VH) on the longitudinal stretching unit in a region directly above at least some of the plurality of the rollers of the preheating station (VH), or laterally to the longitudinal stretching unit, wherein the further assembly provided in the standby position (D) and/or the standby station laterally to the longitudinal stretching unit is joined via heating piping to a heating pipe system for heating the rollers in the preheating station (VH) and connected thereto, and the standby position (D) and/or the standby station is arranged and/or configured in the longitudinal stretching system such that the further assembly provided at this standby position (D) and/or standby station, already before the installation at the operating position (A), is brought or can be brought to operating temperature or at least to a preheating temperature that is higher or less than 30° C. lower than operating temperature, the method comprising:
   in addition to an installation position or operating position (A) for the assembly to be replaced, a standby position (D) and/or standby station at which a further assembly is kept on standby, and
   in that the standby position (D) and/or the standby station used is arranged and/or configured in relation to the longitudinal stretching unit such that the further assembly provided at this standby position (D) and/or standby station, already before the installation at the operating position (A), is brought to operating temperature, or at least to a preheating temperature that is higher or less than 30° C. lower than operating temperature.

\* \* \* \* \*